United States Patent
Ghislaine et al.

(10) Patent No.: US 11,370,936 B2
(45) Date of Patent: Jun. 28, 2022

(54) POLYADDITION-CROSSLINKING SILICONE COMPOSITION THAT IS USEFUL FOR THE OVERMOULDING OF PARTS

(71) Applicant: Elkem Silicones France SAS, Lyons (FR)

(72) Inventors: Perez Ghislaine, Cellieu (FR); David Mariot, Lyons (FR)

(73) Assignee: Elkem Silicones France SAS, Lyons (FR)

( * ) Notice: Subject to any disclaimer, the term of this patent is extended or adjusted under 35 U.S.C. 154(b) by 242 days.

(21) Appl. No.: 16/497,817

(22) PCT Filed: Mar. 29, 2018

(86) PCT No.: PCT/EP2018/058257
§ 371 (c)(1),
(2) Date: Sep. 26, 2019

(87) PCT Pub. No.: WO2018/178319
PCT Pub. Date: Oct. 4, 2018

(65) Prior Publication Data
US 2020/0102474 A1    Apr. 2, 2020

(30) Foreign Application Priority Data

Mar. 29, 2017  (FR) ...................... 1700339

(51) Int. Cl.
*C09D 183/04* (2006.01)
*C08K 3/013* (2018.01)
*C08K 3/08* (2006.01)
*C08K 5/56* (2006.01)

(52) U.S. Cl.
CPC ............ *C09D 183/04* (2013.01); *C08K 3/013* (2018.01); *C08K 3/08* (2013.01); *C08K 5/56* (2013.01)

(58) Field of Classification Search
CPC ...... C09D 183/04; C08G 77/12; C08G 77/20; C08G 77/14; C08L 83/06; C08K 3/013; B29C 45/16; B29C 45/14
See application file for complete search history.

(56) References Cited

U.S. PATENT DOCUMENTS

| | | | | |
|---|---|---|---|---|
| 5,364,921 | A * | 11/1994 | Gray | ...................... C08L 83/00 528/15 |
| 5,837,792 | A * | 11/1998 | Meuwly | ................ C08L 101/00 528/27 |
| 8,901,269 | B2 | 12/2014 | Marrot et al. | |
| 2009/0068475 | A1 | 3/2009 | Bosshammer | |
| 2010/0234510 | A1 | 9/2010 | Feder et al. | |
| 2010/0282410 | A1 | 11/2010 | Pouchelon et al. | |
| 2013/0190470 | A1* | 7/2013 | Marrot | .................. C08G 77/38 528/27 |

FOREIGN PATENT DOCUMENTS

| | | |
|---|---|---|
| EP | 0601881 A1 | 6/1994 |
| EP | 0639622 A2 | 2/1995 |
| EP | 0875536 A2 | 11/1998 |
| EP | 1106662 A2 | 6/2001 |
| EP | 1967551 A1 | 9/2008 |
| FR | 2 840 826 A1 | 12/2003 |
| FR | 2 957 604 A1 | 9/2011 |
| JP | H07166068 A | 6/1995 |
| JP | 2008537967 A | 10/2008 |
| JP | 2010535260 A | 11/2010 |
| JP | 2013527857 A | 7/2013 |
| WO | 2008/000771 A1 | 1/2008 |
| WO | 2008/055985 A1 | 5/2008 |
| WO | 2011117230 A2 | 9/2011 |

OTHER PUBLICATIONS

PCT International Search Report for PCT/EP2018/058257, dated May 23, 2018.

* cited by examiner

*Primary Examiner* — Kuo Liang Peng
(74) *Attorney, Agent, or Firm* — McBee Moore & Vanik IP, LLC

(57) ABSTRACT

A process is provided for preparing composite articles composed of a rigid glass, metal or thermoplastic resin substrate and of a silicone elastomer with good mechanical properties and good adhesion between the substrate and the silicone elastomer E such that there is a solid bond between the two parts. The composite articles are used in very diverse fields such as electrical and electronic equipment, motor vehicle and medical equipment, and they may be found, for example, in household appliances, consumer goods, medical equipment and sports and leisure articles.

14 Claims, No Drawings

POLYADDITION-CROSSLINKING SILICONE COMPOSITION THAT IS USEFUL FOR THE OVERMOULDING OF PARTS

CROSS-REFERENCE TO RELATED APPLICATIONS

This application is the National Stage entry of International Application No. PCT/EP2018/058257, filed 29 Mar. 2018, which claims priority to France No. 1700339, filed 29 Mar. 2017.

BACKGROUND

Field

The field of the invention relates to the use of polyaddition-crosslinking silicone compositions for the overmoulding of parts, notably made of thermoplastic resin, via injection processes. The overmoulding technique has been performed for a long time by injection. This consists in performing total or partial overmoulding of a thermoplastic resin, metal or glass part with a silicone elastomer obtained by crosslinking a silicone composition in an injection-moulding tool.

Description of Related Art

The adhesion of the silicone elastomers obtained by polyaddition-crosslinking of silicone compositions on numerous substrates such as plastics, metals and glass is low. This lack of adhesion tends to cause spontaneous separation or exertion of only a low tensile force between the silicone elastomer and the substrate. Now, in many applications, durable and solid adhesion of the silicone elastomer to the substrate is necessary.

Various technical solutions have been developed to improve the level of adhesion between the silicone elastomer and the substrate, such as pretreatment of the surface of the substrate or the application of a primer. These methods have the drawback of adding additional process steps.

Another means for increasing the adhesion between the silicone elastomer and the substrate is to modify the polyaddition-crosslinking silicone composition to obtain a silicone elastomer which has improved adhesion to the substrate. These silicone compositions are commonly referred to as self-adhesive compositions.

A certain number of adhesion-promoting additives have been used in polyaddition-crosslinking self-adhesive silicone compositions. Patent EP 0601881 teaches the use of compounds comprising, per molecule, at least one hydrogen atom bonded to a silicon atom (at least one Si—H group) and at least one other group chosen from alkoxysilyl, glycidyl or acid anhydride groups to improve the adhesion between a polypropylene resin and a silicone elastomer. Patent EP 0875536 describes the use of alkoxysilane or alkoxysiloxane compounds with at least one epoxy group as adhesion promoters. Glycidodoxypropyltrimethoxysilane is cited as a preferred adhesion promoter. Patent EP 1106662 teaches the use of organosilicon compounds comprising epoxy groups and hydrolysable groups and also organohydrogenopolysiloxanes comprising at least one aromatic $C_6$ nucleus. More recently, patent EP 1967551 describes composite materials comprising silicone elastomers obtained from self-adhesive silicone compositions comprising silicates.

There is an ongoing need to improve the adhesion performance between silicone elastomers obtained from polyaddition-crosslinking silicone compositions and substrates such as glass, metals and thermoplastic resins, while at the same time maintaining excellent mechanical properties. It is also necessary for these silicone compositions to have good fluidity to be able to be pumped in injection or extrusion machines, good stability on storage and a high crosslinking rate at the desired temperatures.

SUMMARY

Thus, one of the subjects of the invention relates to a process for preparing composite articles CA composed of a rigid glass, metal or thermoplastic resin substrate S and of a silicone elastomer E with good mechanical properties and good adhesion between the substrate S and the silicone elastomer E such that there is a solid bond between the two parts.

Another object of the invention is to propose a process for preparing composite articles CA composed of a glass, metal or thermoplastic resin substrate S and of a silicone elastomer E in which the silicone elastomer E is obtained from a polyaddition-crosslinking silicone composition C, with good stability on storage before crosslinking and a sufficient crosslinking rate at the desired temperatures to ensure an industrial throughput rate.

The invention also relates to composite articles CA composed of a rigid glass, metal or thermoplastic resin substrate S and of a silicone elastomer E with good adhesion between the substrate S and the silicone elastomer E such that there is a solid bond between the two parts.

Another subject of the invention relates to polyaddition-crosslinkable silicone compositions C made of silicone elastomers E which have excellent mechanical properties and good adhesion to glass, metals and thermoplastic resins. These silicone compositions C have good fluidity, to be pumped in moulding or extrusion tools, and have good stability on storage.

These silicone compositions C are used in moulding, but may also be useful for the sealing and adhesive bonding of electrical and electronic components.

The silicone compositions C and the composite articles CA according to the invention are used in very diverse fields such as electrical and electronic equipment, motor vehicle and medical equipment, and they may be found, for example, in household appliances, consumer goods, medical equipment and sports and leisure articles.

DETAILED DESCRIPTION OF A PREFERRED EMBODIMENT

According to a first aspect, the invention relates to a process for preparing a composite article CA, comprising the following steps:
  a) a polyaddition-crosslinking silicone composition C is applied to a rigid metal, glass or thermoplastic resin substrate S, said composition comprising:
    (A) at least one organopolysiloxane A comprising per molecule at least two $C_2$-$C_6$ alkenyl groups, bonded to two different silicon atoms,
    (B) at least one organohydrogenopolysiloxane resin B,
    (C) at least one additive X which is a linear organopolysiloxane comprising siloxyl units (I.1) to (I.3) having the following formulae:

(I.1)

(I.2)

(I.3)

and not comprising any units of formula (I.4):

(I.4)

in which:
a=1 and b=1 or 2
d=1 and e=1 or 2
the symbol Y represents a radical comprising a hydrocarbon-based group containing from 2 to 20 carbon atoms and an epoxy function, optionally with one or more heteroatoms such as an oxygen atom; preferably, the symbol Y is chosen from radicals constituted by the group: alkyl glycidyl ether, linear, branched or cyclic epoxyalkyl, linear, branched or cyclic epoxyalkenyl and carboxylic acid glycidyl ester,
the symbols $Z^1$, $Z^2$ and $Z^3$, which may be identical or different, represent a monovalent hydrocarbon-based group containing from 1 to 30 carbon atoms, preferably chosen from the group constituted by alkyl groups containing from 1 to 8 carbon atoms and aryl groups containing from 6 to 12 carbon atoms, and even more preferentially chosen from the group constituted by a methyl, ethyl and propyl group,
with the following conditions:
the additive X comprises, per molecule, at least one siloxyl unit (I.1) bearing epoxy-functional hydrocarbon-based groups, at least three siloxyl units (I.3) bearing hydrogenosiloxyl groups and a total number of siloxyl units N of between 7 and 30,
(D) at least one reinforcing filler D,
(E) at least one organotitanium compound M,
(F) at least one polyaddition catalyst F, preferably a compound of at least one metal belonging to the platinum group, and
(G) optionally an inhibitor G, and
the amounts of the various constituents of said composition C are such that the [≡SiH]/[SiAlkenyl] mole ratio is between 1.5 and 3.6 with
[≡SiH]=total number of moles of siloxyl units comprising a hydrogen atom bonded to silicon, and
[≡SiAlkenyl]=total number of moles of siloxyl units comprising an alkenyl radical bonded to silicon, and
b) said silicone composition C is crosslinked by heating to a temperature of between 40 and 250° C., preferably between 100 and 220° C., to obtain a composite article CA comprising a silicone elastomer E with good adhesion to said rigid substrate S.

In the present invention, the term rigid substrate refers to a substrate which inherently has mechanical strength, so that it does not collapse when it is placed vertically on its edge. It is different from substrates that are commonly referred to as being supple, such as textiles, paper or polymer films.

In the present invention, the term "supple substrate" refers to a substrate which can be curved or folded simply by human force, without breaking or damaging it. In contrast, in the present invention, the term "rigid substrate" refers to a substrate that cannot be curved or folded simply by human force, without breaking or damaging it.

Preferably, the rigid substrate S is chosen from metal and thermoplastic resins.

After numerous tests, the Applicant was able to demonstrate that the presence in the silicone composition C of the organohydrogenopolysiloxane resin B, of the additive X and of the organotitanium compound M makes it possible to obtain optimum properties, i.e.:
excellent adhesion between the silicone elastomer E obtained by crosslinking of the silicone composition C and the rigid substrate S
a good rate of crosslinking of the silicone composition C and
good mechanical properties for the silicone elastomer E obtained by crosslinking of the silicone composition C.

Preferably, the thermoplastic resins used in the process of the invention are resins constituted of polymerized or polycondensed olefins and chosen, for example, from the group constituted by: acrylonitrile-butadiene-styrene (ABS) resins, styrene resins, polyethylene resins, polypropylene resins, polyacetal resins, acrylic resins, polycarbonate (PC) resins, poly(ethylene terephthalate) (PET) resins, poly(butylene terephthalate) (PBT) resins, poly(phenylene oxide) resins, phenolic resins, epoxy resins, Nylon resins, polyamide resins, polyimide resins, aromatic polyether resins such as polyphenylene ethers (PPO) and polyphenylene sulfides (PPS), and mixtures thereof.

Particularly preferably, the thermoplastic resins are chosen from the group constituted by: polyamide 6, polyamide 6.6, poly(butylene terephthalate) (PBT), polyphenylene ethers (PPO), polyphenylene sulfides (PPS), polycarbonates (PC), polyoxymethylene POM, polymethyl methacrylate PMMA, polyether ether ketone PEEK and polystyrene PS.

According to a preferential embodiment of the invention, the additive X comprises per molecule at least two siloxyl units (I.1) bearing hydrocarbon-based groups containing an epoxy function.

According to a preferential embodiment of the invention, the additive X is constituted of siloxyl units chosen from the siloxyl units (I.1) to (I.3) having the following formulae:

(I.1)

(I.2)

(I.3)

in which:
a=1 and b=1 or 2
d=1 and e=1 or 2, and
the symbols Y, $Z^1$, $Z^2$ and $Z^3$ are as defined above.

According to another preferential embodiment, the additive X is constituted of siloxyl units chosen from the siloxyl units (I.1) to (I.3) having the following formulae:

(I.1)

(I.2)

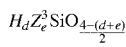 (I.3)

in which:
a=1 and b=1 or 2,
d=1 and e=1, and
the symbols Y, $Z^1$, $Z^2$ and $Z^3$ are as defined above.

According to a preferred embodiment, the additive X has a number N1 of siloxyl units (I.1) and a number N3 of siloxyl units (I.3) which meet the following conditions:
$2 \leq N1 \leq 10$ and preferably $3 \leq N1 \leq 7$, and
$3 \leq N3 \leq 20$ and preferably $5 \leq N3 \leq 20$.

It is particularly advantageous to use an additive X which has a total number N of siloxyl units of between 7 and 25, limits inclusive, and even more preferentially between 7 and 15.

Preferably, the additive X has a dynamic viscosity at 25° C. of between 10 and 300 mPa·s and preferably between 15 and 100 mPa·s.

All the viscosities that are mentioned in the present specification correspond to a "Newtonian" dynamic viscosity magnitude at 25° C., i.e. the dynamic viscosity that is measured, in a manner known per se, with a Brookfield viscometer at a shear rate gradient that is low enough for the measured viscosity to be independent of the rate gradient.

Preferably, the additive X has a content of siloxyl units (I.1) of between 0.020 and 0.45 mol per 100 g of additive X. According to another embodiment, the additive X has a content of siloxyl units (I.1) of between 0.15 and 0.45 mol per 100 g of additive X.

Preferably, the additive X has a content of siloxyl units (I.3) of greater than or equal to 0.3 mol per 100 g of additive X. According to another embodiment, the additive X has a content of siloxyls (I.3) of between 0.3 and 0.85 mol per 100 g of additive X.

According to a particular embodiment, the additive X has a content of siloxyl units (I.1) of between 0.15 and 0.45 mol per 100 g of additive X and a content of siloxyls (I.3) of between 0.3 and 0.85 mol per 100 g of additive X.

Preferably, for the siloxyl unit (I.1), Y is chosen from the group constituted by the groups (R-1) to (R-6) having the following formulae:

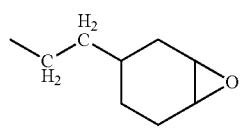 (R-1)

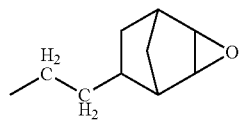 (R-2)

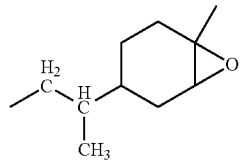 (R-3)

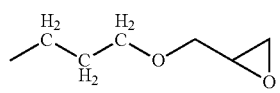 (R-4)

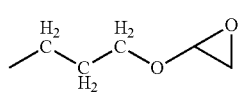 (R-5)

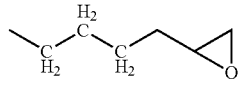 (R-6)

According to a particularly preferred embodiment, for the siloxyl unit (I.1), Y is the group (R-4) having the following formula:

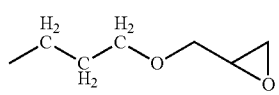 (R-4)

In quantitative terms, it is advantageous for the concentration of epoxy functions in the silicone composition C to be between 0.20 and 5 mmol per 100 g of composition C. Preferentially, the concentration of epoxy functions in the composition C is between 0.25 and 5 mmol per 100 g of composition C and even more preferentially between 0.6 and 5 mmol per 100 g of composition C. When the concentration of epoxy functions is greater than 5 mmol per 100 g of composition C, an increase in the viscosity of the composition C, degradation of the quality of mixing of all of the constituents and a reduction in the rate of crosslinking of the silicone composition C are observed.

According to a preferred embodiment of the invention, the silicone composition C does not comprise any isocyanurate compound.

According to a particular embodiment, the amounts of the various constituents of the composition C are such that the [≡SiH]/[≡SiAlkenyl] mole ratio is between 1.7 and 3.3 with:
  [≡SiH]=total number of moles of siloxyl units comprising a hydrogen atom bonded to silicon, and
  [≡SiAlkenyl]=total number of moles of siloxyl units comprising an alkenyl radical bonded to silicon.

When the [≡SiH]/[≡SiAlkenyl] mole ratio is less than 1.5, the elastomer obtained after crosslinking of the silicone composition does not have sufficient mechanical properties, and notably the hardness obtained is too low. When the [≡SiH]/[≡SiAlkenyl] mole ratio is greater than 3.6, bubbles appear during the mixing of the constituents, which degrades the processability of the mixture and renders the implementation of the process according to the invention difficult.

The organotitanium compound M is preferably a titanium chelate or a metal alkoxide of formula $Ti(OR)_4$ in which R is chosen from linear or branched $C_1$-$C_8$ alkyl groups, alkoxyalkyl groups or acyl groups.

Even more preferentially, the organotitanium compound M is chosen from titanium alkoxides, such as butyl titanate, isopropyl titanate, methyl titanate and octyl titanate. Even more preferentially, the organotitanium compound M is butyl titanate.

The content of organotitanium compound M in the silicone composition A according to the invention is between 0.005 and 0.35 part by weight per 100 parts by weight of the composition C, preferably between 0.03 and 0.25 part by weight per 100 parts by weight of the composition C.

Contents of greater than 0.35 part by weight of the composition C lead to substantial yellowing of the silicone elastomer E and to slowing of the rate of crosslinking of the silicone composition C.

Throughout the present document, reference will be made to elements of conventional nomenclature to denote the siloxyl units M, D, T and Q of the organopolysiloxanes, which, according to the naming widely known in silicone chemistry, represent:
M=siloxyl unit of formula $R_3SiO_{1/2}$
D=siloxyl unit of formulae $R_2SiO_{2/2}$
T=siloxyl unit of formula $RSiO_{3/2}$ and
Q=siloxyl unit of formula $SiO_{4/2}$,
in which the radicals R, which may be identical or different, are monovalent groups.

According to one embodiment of the process according to the invention, the application of the silicone composition C to the rigid substrate S may be performed by casting, with a brush, with a doctor blade, by immersion or by extrusion.

According to a preferred embodiment, the process according to the invention is performed in an injection-moulding machine. It is then an overmoulding process in which moulding with silicone elastomer E is performed on a part or all of the rigid substrate S. Various types of overmoulding processes may be performed: insert overmoulding or overmoulding with a rotating mould In the case of insert overmoulding, the rigid glass, metal or thermoplastic resin substrate S is introduced into the mould of the injection moulding machine which contains the silicone composition C that crosslinks under the effect of heat to give the silicone elastomer E. The rigid substrate S was able to be obtained beforehand by moulding thermoplastic resin in the same or another injection moulding machine.

In the case of overmoulding with a rotating mould, the process is performed in a moulding machine with two injection units which uses a rotating mould comprising a plate that can be placed in rotation and containing the imprint part(s), on the moving part of the tool. Half of the mould is fixed onto this rotating plate (hydraulic or electric). After injection of the thermoplastic material with the main injection unit to obtain the rigid thermoplastic resin substrate S, the imprint-carrying plate undergoes a rotation enabling the insert to be overmoulded (in this case the rigid thermoplastic resin substrate S) to be positioned at the level of injection of the silicone elastomer. The silicone composition C is then injected and crosslinked under the effect of heat to obtain an integrally moulded composite article CA.

Any automatic machine or device for automatic injection moulding may be used to perform the process according to the invention. The technical selection of the injection moulding machine is determined by the viscosity of the silicone composition and the dimensions of the moulded parts. The silicone composition C is obtained by mixing all of the components before injecting the mixture into the mould. The mould containing it does not need to be coated or treated with mould-release compounds in order to keep the adhesion to the surface of the tool low enough for release from the mould.

According to one embodiment of the invention, the organopolysiloxane A comprises:
(i) at least two siloxyl units (I.5) having the following formula $$W_a Z_b SiO_{\frac{4-(a+b)}{2}} \quad (I.5)$$

in which:
a=1 or 2, b=0, 1 or 2 and a+b=1, 2 or 3;
W represents, independently, an alkenyl group, preferably containing from 2 to 6 carbon atoms, and even more preferentially a vinyl or allyl group, and
Z represents, independently, a monovalent hydrocarbon-based group containing from 1 to 30 carbon atoms and preferably chosen from the group constituted by alkyl groups containing from 1 to 8 carbon atoms inclusive, and even more preferentially chosen from the group constituted by a methyl, ethyl, propyl and 3,3,3-trifluoropropyl radical,
(ii) and optionally other siloxyl units (I.6) having the following formula $$Z_c SiO_{(4-c)/2} \quad ((I.6)$$

in which:
Z has the same meaning as above, and
c represents an integer equal to 0, 1, 2 or 3.

According to a preferred embodiment, in formula (I.5), a=1 and a+b=2 or 3 and in formula (I.6) c=2 or 3. It is understood in formulae (I.5) and (I.6) above that, if several radicals W and Z are present, they may be identical to or different from each other.

The organopolysiloxane A preferably has a linear, optionally cyclic structure. These linear organopolysiloxanes have a dynamic viscosity at 25° C. of between 100 mPa·s and 120 000 mPa·s and more preferably between 10 000 mPa·s and 120 000 mPa·s.

When they are linear organopolysiloxanes, they may be chosen from the group constituted by:
dimethylvinylsilyl-terminated polydimethylsiloxanes;
dimethylvinylsilyl-terminated poly(vinylmethylsiloxane-co-dimethylsiloxanes);
trimethylsilyl-terminated poly(dimethylsiloxane-co-vinylmethylsiloxanes);
cyclic polymethylvinylsiloxanes.

According to one embodiment of the invention, the organohydrogenopolysiloxane resin B is a branched organohydrogenopolysiloxane comprising siloxyl units of formulae (I.7) and (I.8) below:

$$H_a Z^1_b SiO_{\frac{4-(a+b)}{2}} \quad (I.7)$$

$$Z^1_c SiO_{\frac{4-c}{2}} \quad (I.8)$$

in which:
a=1 or 2, b=0, 1 or 2 and a+b=1, 2 or 3;
c=0, 1, 2 or 3, with at least one unit (I.8) in which c=0 or 1;
$Z^1$ represents, independently, a monovalent hydrocarbon-based group containing from 1 to 30 carbon atoms and preferably chosen from the group constituted by alkyl groups containing from 1 to 8 carbon atoms, and even more preferentially chosen from the group constituted by a methyl, ethyl, propyl and 3,3,3-trifluoropropyl radical.

In a preferred embodiment of the invention, the organohydrogenopolysiloxane resin B comprises at least three hydrogen atoms each bonded to different silicon atoms. This resin B is chosen from the group constituted by the following silicone resins:
M'Q in which the hydrogen atoms bonded to silicon atoms are borne by the groups M, MM'Q in which the hydrogen atoms bonded to silicon atoms are borne by a part of the units M, MD'Q in which the hydrogen atoms bonded to silicon atoms are borne by the groups D, MDD'Q in which the hydrogen atoms bonded to silicon atoms are borne by a part of the groups D, MM'TQ in which the vinyl groups are included in a part of the units M, MM'DD'Q in which the vinyl groups are included in a part of the units M and D, and mixtures thereof, with:

M, D, T and Q as defined previously

M'=siloxyl unit of formula $R_2HSiO_{1/2}$

D'=siloxyl unit of formula $RHSiO_{2/2}$, and the groups R, which may be identical or different, are monovalent hydrocarbon-based groups chosen from alkyl groups containing from 1 to 8 carbon atoms inclusive such as methyl, ethyl, propyl and 3,3,3-trifluoropropyl groups. Preferably, the groups R are methyls.

Preferably, the organohydrogenopolysiloxane resin B is a resin M'Q or MD'Q as described above. Even more preferentially, the organohydrogenopolysiloxane resin B is a resin M'Q.

Advantageously, the organohydrogenopolysiloxane resin B contains between 2% and 40% by weight of Si—H groups, preferably between 10% and 35% by weight of Si—H groups and even more preferentially between 15% and 30% by weight of Si—H groups.

According to one embodiment of the invention, the organohydrogenopolysiloxane resin B is present in the composition C at between 0.1 and 2.5 parts by weight, more preferentially between 0.3 and 2.2 parts by weight per 100 parts by weight of composition C.

The absence of branched organohydrogenopolysiloxane resin B in the composition C leads to a loss of adhesion between the silicone elastomer E obtained by crosslinking of the silicone composition C and the rigid substrate S. An excessive amount of organohydrogenopolysiloxane resin B increases the content of Si—H groups of the composition C and does not make it possible to maintain the preferred [≡SiH]/[≡SiAlkenyl] mole ratio as described previously optimized for the application.

According to another embodiment of the process according to the invention, the composition C may also comprise a linear organohydrogenopolysiloxane H including siloxyl units of formulae (I.9) and optionally (I.10) below:

$$H_a L_b^1 SiO_{\frac{4-(a+b)}{2}} \quad (I.9)$$

$$Z_c^1 SiO_{\frac{4-c}{2}} \quad (I.10)$$

in which:

a=1 or 2, b=0, 1 or 2 and a+b=2 or 3,

H represents a hydrogen atom, $L^1$ represents, independently, a monovalent hydrocarbon-based group containing from 1 to 30 carbon atoms and preferably chosen from the group constituted by alkyl groups containing from 1 to 8 carbon atoms inclusive, and even more preferentially chosen from the group constituted by a methyl, ethyl, propyl and 3,3,3-trifluoropropyl radical, and c=2 or 3, $Z^1$ represents, independently, a monovalent hydrocarbon-based group containing from 1 to 30 carbon atoms and preferably chosen from the group constituted by alkyl groups containing from 1 to 8 carbon atoms inclusive, and even more preferentially chosen from the group constituted by a methyl, ethyl, propyl and 3,3,3-trifluoropropyl radical.

The dynamic viscosity of the linear organohydrogenopolysiloxane H is greater than or equal to 5, preferably greater than or equal to 10 and even more preferentially is between 20 and 1000 mPa·s.

The linear organohydrogenopolysiloxane H may have a linear, optionally cyclic structure. The degree of polymerization is greater than or equal to 2. More generally, it is less than 5000.

Examples of hydrogenosiloxyl units of formula (I.7) are units M' and D' as described previously in which R represents a methyl group.

Examples of crosslinking silicone oils H are:

$M_2'D_xD_y'$: hydrogenodimethylsilyl-terminated dimethylpolysiloxanes, poly(dimethylsiloxane) (methylhydrogenosiloxy) α,ω-dimethylhydrogenosiloxane, $M_2D_xD_y'$: copolymers bearing trimethylsilyl-terminated dimethylhydrogenomethylpolysiloxane (dimethyl) units, $M_2'D_xD_y'$: copolymers bearing hydrogenodimethylsilyl-terminated dimethylhydrogenomethylpolysiloxane units, $M_2D_x'$: trimethylsilyl-terminated hydrogenomethylpolysiloxanes, $M_zM_t'D_xD_y'$: copolymers bearing trimethylsilyl-terminated dimethylhydrogenomethylpolysiloxane (dimethyl) units and copolymers bearing trimethylsilyl-terminated dimethylhydrogenomethylpolysiloxane (dimethyl) units, $D_4'$: cyclic hydrogenomethylpolysiloxanes, with x, y, z and t being integer or decimal numbers and z+t=2.

According to a preferred embodiment of the invention, the reinforcing filler D is chosen from mineral materials, in particular siliceous materials. The reinforcing siliceous fillers are chosen from colloidal silicas, combustion and precipitation silica powders, or mixtures thereof. These silica powders have a mean particle size of less than 0.1 μm and a specific surface area, measured according to the BET method, of at least 20 m²/g, preferably greater than 50 m²/g and even more preferentially between 100 and 400 m²/g.

These silicas may be incorporated as such or after having been treated with organosilicon compounds to make them hydrophobic. Among these compounds are methylpolysiloxanes such as hexamethyldisiloxane, octamethylcyclotetrasiloxane, methylpolysilazanes such as hexamethyldisilazane, hexamethylcyclotrisilazane, chlorosilanes such as dimethyldichlorosilane, trimethylchlorosilane, methylvinyldichlorosilane, dimethylvinylchlorosilane, alkoxysilanes such as dimethyldimethoxysilane, dimethylvinylethoxysilane, trimethylmethoxysilane. During this treatment, the starting weight of the silicas may increase by up to 20%, preferably about 10%.

Advantageously, the reinforcing filler D is a fumed silica with a specific surface area measured according to the BET method of between 100 and 400 m²/g. Even more advantageously, the reinforcing filler D is a fumed silica with a specific surface area measured according to the BET method of between 100 and 400 m²/g and which has been treated with organosilicon compounds.

According to a particular embodiment of the invention, the silicone composition C comprises from 20 to 50 parts by weight of reinforcing filler D, more preferentially from 20 to 40 parts of reinforcing filler D per 100 parts by weight of silicone composition C.

The polyaddition catalysts F are well known. Use is preferably made of platinum and rhodium compounds. Use may be made in particular of complexes of platinum and of an organic product described in U.S. Pat. Nos. 3,159,601, 3,159,602, 3,220,972 and European patents EP-A-0 057 459, EP-A-0 188 978 and EP-A-0 190 530, complexes of platinum and of vinyl organosiloxanes described in U.S. Pat. Nos. 3,419,593, 3,715,334, 3,377,432 and 3,814,730. The catalyst F that is generally preferred is platinum. In this case, the weight amount of catalyst F, calculated as weight of platinum metal, is generally between 2 and 400 ppm, preferably between 5 and 200 ppm based on the total weight of the composition C. Advantageously, the platinum metal content of the composition C is between 10 and 120 ppm, preferentially between 10 and 95 ppm, more preferentially between 10 and 70 ppm and even more preferentially between 10 and 60 ppm by mass based on the total weight of the composition C.

The crosslinking inhibitor G (or addition reaction retarder) may, itself, be chosen from the following compounds:
- an organopolysiloxane, which is advantageously cyclic, and substituted with at least one alkenyl, tetramethylvinyltetrasiloxane being particularly preferred,
- pyridine,
- organic phosphines and phosphites,
- unsaturated amides,
- alkyl maleates
- and acetylenic alcohols.

These acetylenic alcohols (cf. FR-B-1 528 464 and FR-A-2 372 874), which are among the preferred thermal blockers of hydrosilylation reactions, have the formula:

$$(R_1)(R_2)C(OH)-C\equiv H$$

in which formula:
- $R_1$ is a linear or branched alkyl radical, or a phenyl radical;
- $R_2$ is a hydrogen atom, a linear or branched alkyl radical, or a phenyl radical;
- the radicals $R_1$, $R_2$ and the carbon atom alpha to the triple bond optionally forming a ring; and
- the total number of carbon atoms contained in $R_1$ and $R_2$ being at least 5, preferably from 9 to 20.

Said alcohols are preferably chosen from those with a boiling point above 250° C. Examples that may be mentioned include the following products, which are commercially available:
- 1-ethynyl-1-cyclohexanol;
- 3-methyl-1-dodecyn-3-ol;
- 3,7,11-trimethyl-1-dodecyn-3-ol;
- 1,1-diphenyl-2-propyn-1-ol;
- 3-ethyl-6-ethyl-1-nonyn-3-ol;
- 3-methyl-1-pentadecyn-3-ol.

Such a crosslinking inhibitor is present in a maximum proportion of 3000 ppm, preferably in a proportion of 100 to 2000 ppm relative to the total weight of the composition C.

According to another of its aspects, the invention relates to a composite article CA comprising a rigid glass, metal or thermoplastic resin substrate S and a silicone elastomer E obtained by crosslinking a silicone composition C as defined above.

The rigid substrate S is preferably a moulded thermoplastic resin object.

According to one embodiment of the invention, the composite article CA is obtained by moulding the silicone composition C in an injection moulding tool. In this case, the composite article CA is a composite moulded article.

According to a particularly preferred embodiment, the composite article CA is integrally moulded. This is the case when the substrate S is moulded thermoplastic resin and the silicone elastomer E has also been obtained by moulding. Preferably, the integrally moulded composite article CA is made with one or more injection moulding tools.

Another subject of the invention relates to the polyaddition-crosslinking silicone composition C comprising:
(A) at least one organopolysiloxane A comprising per molecule at least two $C_2$-$C_6$ alkenyl groups, bonded to two different silicon atoms,
(B) at least one organohydrogenopolysiloxane resin B,
(C) at least one additive X which is a linear organopolysiloxane comprising siloxyl units (I.1) to (I.3) having the following formulae:

$$Y_a Z_b^1 SiO_{\frac{4-(a+b)}{2}} \quad (I.1)$$

$$Z_3^2 SiO_{\frac{1}{2}} \quad (I.2)$$

$$H_d Z_e^3 SiO_{\frac{4-(d+e)}{2}} \quad (I.3)$$

and not comprising any units of formula (I.4):

$$Z_2^2 SiO_{\frac{2}{2}} \quad (I.4)$$

in which:
- a=1 and b=1 or 2
- d=1 and e=1 or 2
- the symbol Y represents a radical comprising a hydrocarbon-based group containing from 2 to 20 carbon atoms and an epoxy function, optionally with one or more heteroatoms such as an oxygen atom; preferably, the symbol Y is chosen from radicals constituted by the group: alkyl glycidyl ether, linear, branched or cyclic epoxyalkyl, linear, branched or cyclic epoxyalkenyl and carboxylic acid glycidyl ester,
- the symbols $Z^1$, $Z^2$ and $Z^3$, which may be identical or different, represent a monovalent hydrocarbon-based group containing from 1 to 30 carbon atoms, preferably chosen from the group constituted by alkyl groups containing from 1 to 8 carbon atoms and aryl groups containing from 6 to 12 carbon atoms, and even more preferentially chosen from the group constituted by a methyl, ethyl and propyl group, with the following conditions:
- the additive X comprises, per molecule, at least one siloxyl unit (I.1) bearing epoxy-functional hydrocarbon-based groups, at least three siloxyl units (I.3) bearing hydrogenosiloxyl groups and a total number of siloxyl units N of between 7 and 30, (D) at least one reinforcing filler D,
(E) at least one organotitanium compound M,
(F) at least one polyaddition catalyst F, preferably a compound of at least one metal belonging to the platinum group, and
(G) optionally an inhibitor G, and
the amounts of the various constituents of said composition C are such that the [≡SiH]/[≡SiAlkenyl] mole ratio is between 1.5 and 3.6 with
   [≡SiH]=total number of moles of siloxyl units comprising a hydrogen atom bonded to silicon, and
   [≡SiAlkenyl]=total number of moles of siloxyl units comprising an alkenyl radical bonded to silicon.

The various constituents A, B, X, D, M, F and G of the composition C and the concentrations thereof in the silicone composition C are as described above.

According to another embodiment of the invention, the silicone composition C may also comprise a linear organohydrogenopolysiloxane H as defined above.

Advantageously, the silicone composition C comprises per 100 parts by weight of composition C:
   from 0.1 to 2.5 parts by weight of organohydrogenopolysiloxane resin B
   from 0.4 to 2 parts by weight of additive X and
   from 0.005 to 0.35 part by weight of organotitanium compound M.

Even more preferentially, the silicone composition C comprises per 100 parts by weight of composition C:
   from 0.3 to 2.2 parts by weight of organohydrogenopolysiloxane resin B
   from 0.4 to 2 parts by weight of additive X and
   from 0.03 to 0.25 part by weight of organotitanium compound M.

According to another preferential embodiment of the invention, the silicone composition C comprises per 100 parts by weight of composition C:
   from 55 to 80 parts by weight of organopolysiloxane A
   from 0.3 to 2.2 parts by weight of organohydrogenopolysiloxane resin B
   from 0.4 to 2 parts by weight of additive X and
   from 0.03 to 0.25 part by weight of organotitanium compound M
   from 20 to 40 parts by weight of reinforcing filler D
   from 0.002 to 0.01 part by weight of platinum and
   from 0 to 0.1 part by weight of inhibitor G.

According to another preferential embodiment of the invention, the silicone composition C is constituted of per 100 parts by weight of composition C:
   from 55 to 80 parts by weight of organopolysiloxane A
   from 0.3 to 2.2 parts by weight of organohydrogenopolysiloxane resin B
   from 0.4 to 2 parts by weight of additive X and
   from 0.03 to 0.25 part by weight of organotitanium compound M
   from 20 to 40 parts by weight of reinforcing filler D
   from 0.002 to 0.01 part by weight of platinum,
   from 0 to 0.1 part by weight of inhibitor G and
   from 0 to 3 parts by weight of linear organohydrogenopolysiloxane H.

The preparation of the silicone composition C according to the invention consists simply in mixing the various constituents A, B, X, D, M, F and optionally G, and H using mixing means and methodologies known to those skilled in the art. The mixing is preferably performed with mixers that are suitable for compositions with a high viscosity, for example blenders or planetary mixers under atmospheres of inert gas.

In a preferred embodiment, the reinforcing fillers D are treated in situ with the hydrophobization agent, preferably hexamethyldisilazane and/or divinyl tetramethyldisilazane in the presence of a portion of the compound A and water, at a temperature between temperatures of 60 to 80° C. for at least 30 minutes in a mixing system that is suitable for high-viscosity materials, for example a blender or a planetary mixer. Next, a step of evaporation under normal pressure and then under vacuum is performed to separate out the excess hydrophobizing agent and water. The other components are then mixed efficiently in the same machine for 10 to 30 minutes. The polyaddition catalyst F is preferably added last.

It is possible to prepare partial mixtures since the compounds B, X and H must preferably be stored separately from the catalyst F.

Thus, according to another of its aspects, the present invention relates to a two-component system which is a precursor of the composition C according to the invention and as described above, being in two separate parts C1 and C2 which are intended to be mixed to form the composition C, characterized in that one of these parts contains the catalyst F whereas the other part contains the additive X, the resin B and the organohydrogenopolysiloxane H when it is present.

The invention also relates to the silicone elastomer E obtained by crosslinking and/or curing of the silicone composition C according to the invention and as described above.

A final subject of the invention relates to the use of a composition C as described above in cast moulding, transfer moulding, injection moulding, extrusion moulding or compression moulding.

The examples that follow are given as a guide and cannot be considered as a limit of the field and spirit of the invention.

EXAMPLES

1) Definition of the Constituents:
Base Composition: A blender is loaded with 67 parts of a mixture of two polydimethylsiloxane oils blocked at each of the chain ends with a $(CH_3)_2ViSiO_{1/2}$ unit, having a viscosity of 60 000 mPa·s and 100 000 mPa·s, 26 parts of fumed silica with a specific surface area, measured by the BET method, of 300 $m^2/g$ and 7 parts of hexamethyldisilazane. The whole is heated at 70° C. with stirring for 1 hour and then devolatilized, cooled and stored.

Si—H Resin: organopolysiloxane of formula $M'_4Q$ containing 24% by weight of Si—H groups Si—H Oil: linear organopolysiloxane comprising hydrogenosilyl units in the chain and at the chain end and containing about 20% by weight of Si—H groups HVI1: Vinyl oil with a viscosity of 1000 mPa·s comprising vinyl units only in the chain.

HVI2: Vinyl oil with a viscosity of 350 mPa·s comprising vinyl units in the chain and at the chain end.

Catalyst C1: platinum metal, introduced in the form of an organometallic complex containing 10% by weight of platinum metal, known as a Karstedt catalyst, diluted in HVI1.

Inhibitor: 1-ethynyl-1-cyclohexanol or ECH,
butyl titanate: $Ti(OBu)_4$ or TBOT
various adhesion promoters comprising epoxy units were synthesized (see above)
vinyltrimethoxysilane VTMO was also tested as an adhesion promoter.

Preparation of the Adhesion Promoters

Two additives X1 and X2 were synthesized, constituted of:

n YCH$_3$SiO$_{2/2}$ units
m HCH$_3$SiO$_{2/2}$ units
2 (CH$_3$)$_3$Si$_{1/2}$ units in which Y is the epoxy group having the following formula

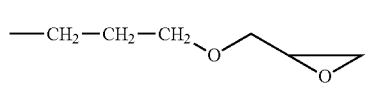  Y

Additive X1

1733.9 g of toluene and 2.7 g of a platinum carbene complex, sold by Umicore under the trade name Umicore HS432®, are placed in a 10 L reactor under nitrogen. This mixture is stirred and heated to 77° C. A mixture of allyl glycidyl ether (AGE) (390.5 g, 3.42 mol) and a polymethylhydrogenosiloxane comprising 20 (CH$_3$)HSiO$_{2/2}$ units and two (CH$_3$)$_3$SiO$_{1/2}$ end units (5599.5 g, SiH=82.23 mol) is added using a pump over 54 minutes. When the addition is complete, heating is maintained for 1 hour. The heating is then stopped and, after returning to room temperature, the reaction medium is devolatilized at 40° C. under 5 mbar for 1 hour and the temperature is then raised gradually to 85° C. over 4 hours. The temperature is maintained at 85° C. for 1 hour to give a functionalized silicone oil (7727.8 g) composed of n YCH$_3$SiO$_{2/2}$ units, m HCH$_3$SiO$_{2/2}$ units and two (CH$_3$)$_3$Si$_{1/2}$ units with the following characteristics: n+m=20, [SiH]=1.30 mol/100 g; [Epoxy]=37.7 mmol/100 g; Viscosity=12.3 mPa·s.

Additive X2

181.0 g of toluene are placed in a 1 L reactor under nitrogen. The medium is stirred and heated to 85° C. When the temperature is reached, 10.2 mg of a platinum carbene complex sold by Umicore under the trade name Umicore HS432® are added. Next, a mixture of allyl glycidyl ether (AGE) (236.8 g, 2.07 mol) and of a polymethylhydrogenosiloxane with 9 (CH$_3$)HSiO$_{2/2}$ units and two (CH$_3$)$_3$SiO$_{1/2}$ end units (363.2 g, SiH=4.77 mol) is added dropwise over 4 hours. After returning to room temperature, the reaction medium is devolatilized at 25-30° C. under 0-3 mbar for 30 minutes and then at 85° C. (nominal) under 1 mbar for 3 hours to give a functionalized silicone oil composed of n YCH$_3$SiO$_{2/2}$ units, m HCH$_3$SiO$_{2/2}$ units and two (CH$_3$)$_3$Si$_{1/2}$ units with the following characteristics: n+m=9, [SiH]=586 mmol/100 g; [Epoxy]=291 mmol/100 g; Viscosity=32 mPa·s.

Additive C1 is 3-glycidyloxypropyltrimethoxysilane or GLYMO

TABLE 1

Summary of the adhesion additives with epoxy units

| Adhesion additive | Total number of siloxyl units | Number of (CH$_3$)$_2$SiO$_{2/2}$ units | [SiH] mmol/100 g | [Epoxy] mmol/100 g |
|---|---|---|---|---|
| X1 Invention | 22 | 0 | 1300 | 38 |
| X2 Invention | 11 | 0 | 586 | 291 |
| C1 Comparative | 1 | 0 | 0 | 423 |

2) Tests Performed

All of the constituents of the formulations described in the tables below except for the catalyst are placed under vacuum in a suitable mixing tool, of speed mixer type. After having homogenized the reaction mixture for 3 minutes, the platinum catalyst is added and the mixture is mixed once again. The mixing steps take place at room temperature. Once the mixture is homogeneous, the vulcanization can be performed, i.e. crosslinking under the effect of heat of the silicone composition to obtain an elastomer.

3) Characterization

Rate of crosslinking: Three samples of the silicone composition obtained after mixing all of the constituents are taken from different places in order to check the homogeneity of the mixture.

About 5 g of sample are placed in the heated hermetic chamber of a Monsanto MDR 2000E rheometer. The hermetic chamber is composed of two direct-heating matrices. The desired temperature is imposed, either 115 or 170° C. The lower chamber is made to oscillate at an amplitude of 0.5° of angle at a frequency of 100 cycles per minute, i.e. 1.66 Hz at a temperature of 170° C. The upper matrix records the reaction torque S* transmitted by the sample. A vulcanization curve is thus obtained, which describes the variation of the torque S* expressed in dN.m as a function of the time at a given temperature. In accordance with the standard ISO 6502, this torque variation is correlated with the degree of vulcanization of the elastomer as a function of the time according to the standard.

The rheometer records in the course of the measurement the temperature of one of the matrices, the elastic modulus S' and the viscous modulus S. These data make it possible to obtain:

TC10 (s): the time that the reaction takes to reach 10% crosslinking, in our case it corresponds to the safety time (also known as the scorch time). This is the maximum time beyond which the product is no longer manipulable (transformable)=>risk of defects in the moulded part Peak rate (dNm/min): corresponds to the maximum reaction rate during the crosslinking, which makes it possible to compare the rates of crosslinking of the various compositions.

Mechanical properties: A fraction of the homogeneous mass obtained is then vulcanized, under pressure, for 5 minutes at 170° C., working in a suitable mould making it possible to obtain plates 2 mm thick. Plates in non-annealed (NA) form are thus obtained. A fraction of the plates is then subjected to annealing for 4 hours at 200° C. (A). Normalized samples are then collected from all of these plates and the following properties are measured:

Shore A hardness (SAH) on a thickness of 6 mm according to the standard DIN 53505,
breaking strength (BS) in MPa according to the standard AFNOR NF T 46002,
elongation at break (EB) in % according to the standard AFNOR NF T 46002,
elastic modulus (Mod 100%) at 100% elongation in MPa according to the standard AFNOR NF T 46002 and
tear strength Ts in kN/m according to the standard ASTMD 624A.

Adhesion

The adhesion performance of the various formulations is determined by measuring the tensile shear strength (Ss) according to a protocol derived from the standard ISO 4587.

Specimens made of various materials (thermoplastic resins, steel, aluminium or glass) of dimensions 100×25 mm (L×I) are used. The thickness of the specimens varies as a function of the material, generally 3-4 mm for thermoplastic resins. Two specimens are adhesively bonded together, the overlap zone being 25×12 mm with a thickness of silicone composition about 0.5 mm thick.

The composite is then baked at 170° C. for 20 minutes and a first adhesion measurement is taken as described below (NA results=non-annealed). Certain composites are subjected to annealing at 100° C. for 1 hour (A results=annealed).

To measure the adhesion, one of the two specimens is fixed and the force required to break the adhesion is then measured with a tensile testing machine by pulling on the other specimen in the direction of the length. During the pulling of the upper specimen, a shear becomes created in the adhesive bond. This test makes it possible to determine the force required, along an axis, to "detach" the two specimens. The strength of the support-matrix bonds is measured, which thus makes it possible to determine the cohesion and the breaking strength expressed in MPa.

It is desired to obtain a cohesive break, i.e. breaking of the silicone elastomer rather than simple detachment of the upper specimen (adhesive break).

TABLE 2

Formulations tested with various adhesion promotors (parts by weight)

| Tests | Comp. 1 | Comp. 2 | Ex. 1 | Ex. 2 | Comp. 3 | Comp. 4 |
|---|---|---|---|---|---|---|
| Base Composition | 89.9 | 89.9 | 89.9 | 89.5 | 89.9 | 89.9 |
| HVI1 Oil | 3.7 | 3.7 | 3.7 | 3.7 | 3.7 | 3.7 |
| HVI2 Oil | 4.5 | 4.1 | 4.4 | 4.5 | 3.6 | 3.2 |
| SiH resin | 1.4 | 1.4 | 1.4 | 1.4 | 1.4 | 1.4 |
| SiH oil | 0 | 0 | 0 | 0 | 0.5 | 0.5 |
| ECH | 0.05 | 0.05 | 0.05 | 0.05 | 0.05 | 0.05 |
| Additive X1 | 0.45 | 0.45 | 0.45 | 0 | 0 | 0 |
| Additive X2 | 0 | 0 | 0 | 0.66 | 0 | 0 |
| Glymo | 0 | 0 | 0 | 0 | 0.9 | 0.9 |
| VTMO | 0 | 0.45 | 0 | 0 | 0 | 0 |
| TBOT | 0 | 0 | 0.18 | 0.18 | 0 | 0.36 |
| Platinum ppm | 50 | 50 | 50 | 50 | 50 | 50 |
| Total | 100 | 100 | 100 | 100 | 100 | 100 |
| mmol epoxy/100 g formulation | 0.3 | 0.3 | 0.3 | 1.9 | 3.8 | 3.8 |
| SiH/Vi mole ratio | 2.2 | 1.6 | 2.2 | 1.9 | 2.5 | 2.6 |

For all of the formulations tested, the SiH/Vi mole ratio is between 1.6 and 2.6.

TABLE 3

Characterization of the adhesion of the silicone elastomer to polyamide 6 and polyamide 66 (in MPa) and rate of crosslinking of the silicone composition

| Test | Comp. 1 | Comp. 2 | Ex. 1 | Ex. 2 | Comp. 3 | Comp. 4 |
|---|---|---|---|---|---|---|
| PA 6 (non-annealed) | 0.2 | 0 | 1.4 | 2 | 0 | 0.9 |
| PA 6 (annealed) | 0 | 0 | 2.2 | 2.9 | 0 | 1.1 |
| PA 66 (non-annealed) | 0.3 | 0 | 2.2 | 1.9 | 0 | 1.2 |
| PA 66 (annealed) | 0 | 0 | 1.8 | 2.9 | 0 | 1.1 |
| Peak Rate (dNm/min) | 60 | 51 | 58.5 | 53.1 | 63.1 | 65.1 |
| TC 10 (s) | 9.4 | 9.1 | 8.6 | 7.6 | 7.6 | 7.2 |

The results presented in the above table show that the presence of SiH resin, of the additives X1 and X2 according to the invention and of butyl titanate in the silicone composition make it possible to obtain excellent adhesion performance of the annealed or non-annealed silicone elastomer on polyamide 6 or polyamide 6.6 (Examples 1 and 2). The addition of butyl titanate makes it possible to improve the adhesion of the silicone elastomer to a polyamide 6 or 66 support, for the same concentration of epoxy groups in the silicone composition (Example 1 and Comparative 1). Comparative example 4 shows that the use of 3-glycidyloxypropyltrimethoxysilane as adhesion-promoting additive instead of the additives X1 or X2 leads to poorer adhesion performance. It is desirable to obtain a silicone elastomer with adhesion to polyamide 6 or 6.6 of greater than 1.2 MPa when it is non-annealed and greater than 1.5 MPa after annealing.

TABLE 4

Mechanical properties of the non-annealed and annealed silicone elastomers

|  | Comp. 1 | Comp. 2 | Ex. 1 | Ex. 2 | Comp. 3 | Comp. 4 |
|---|---|---|---|---|---|---|
| Non-annealed elastomer | | | | | | |
| SAH | 47 | 48 | 42 | 46 | 44 | 46 |
| BS (MPa) | 7.8 | 7.4 | 6.9 | 6.9 | 8.8 | 7.9 |
| EB (%) | 727 | 682 | 722 | 670 | 805 | 771 |
| Ts (N/mm) | 41 | 39 | 37 | 39 | 40 | 39 |
| Annealed elastomer | | | | | | |
| SAH | 50 | 53 | 54 | 50 | 50 | 52 |
| BS (MPa) | 8.4 | 8.4 | 8.1 | 7.6 | 8.1 | 6.9 |
| EB (%) | 725 | 620 | 620 | 629 | 672 | 570 |
| Ts (N/mm) | 47 | 45 | 45 | 50 | 46 | 45 |

The mechanical properties of the silicone elastomers obtained are satisfactory.

Optimization of the Composition Comprising the Additive X1

Various formulations were tested by varying the content of additive X1, of SiH resin and of butyl titanate.

TABLE 5

Formulations tested

| Test | Comp. 5 | Ex. 3 | Ex. 4 | Ex. 5 | Ex. 6 |
|---|---|---|---|---|---|
| Base Composition | 89.4 | 89.4 | 89.4 | 89.4 | 89.4 |
| HVI1 Oil | 3.7 | 3.7 | 3.7 | 3.7 | 3.7 |
| HVI2 Oil | 4.5 | 4.5 | 4.5 | 4.5 | 4.5 |
| SiH resin | 1.4 | 1.4 | 1.1 | 0.7 | 0.5 |
| Additive X1 | 0.9 | 0.80 | 1.08 | 1.45 | 1.78 |
| TBOT | 0 | 0.09 | 0.135 | 0.09 | 0.045 |
| ECH | 0.05 | 0.05 | 0.05 | 0.05 | 0.05 |
| Platinum ppm | 50 | 50 | 50 | 50 | 50 |
| Total | 100 | 100.0 | 100 | 100 | 100 |
| mmol epoxy/100 g formulation | 0.6 | 0.5 | 0.7 | 1.0 | 1.2 |
| SiH/Vi mole ratio | 2.9 | 2.7 | 2.9 | 3.1 | 3.4 |

For all of the formulations tested, the SiH/Vi mole ratio is between 2 and 3.4.

TABLE 6

Adhesion characterization of the of the silicone elastomer on various supports (in MPa) and rate of crosslinking of the silicone composition

| Test | Comp. 5 | Ex. 3 | Ex. 4 | Ex. 5 | Ex. 6 |
|---|---|---|---|---|---|
| PA6 (NA) | 0.4 | 1.2 | 2.0 | 1.9 | 2.3 |
| PA6 (A) | 0.4 | 1.8 | 1.9 | 1.9 | 2.1 |
| PA66 (NA) | 0.5 | 1.8 | 1.8 | 2.3 | 1.9 |
| PA66 (A) | 0.8 | 1.7 | 1.9 | 1.6 | 1.8 |
| Alu (NA) | 1.3 | 1.0 | 1.5 | 1.8 | 1.6 |
| Alu (A) | 1.7 | 1.4 | 1.9 | 1.9 | 2.1 |
| Steel (NA) | 1.8 | 1.7 | 1.6 | 2.0 | 2.0 |
| Steel (A) | 1.8 | 2.1 | 2.0 | 1.8 | 2.1 |
| Peak rate (S'/min) | 38.1 | 37.3 | 39.4 | 39.3 | 39.7 |

All of the compositions according to the invention (Examples 3 to 6) have good crosslinking kinetics and make it possible to obtain an elastomer with good mechanical properties and good adhesion to the various supports. It is found that in the absence of TBOT (Comparative 5), the adhesion of the silicone elastomer to polyamide 6 or 6.6 is unsatisfactory.

TABLE 7

Mechanical properties of the non-annealed and annealed silicone elastomers

| | Comp. 5 | Ex. 3 | Ex. 4 | Ex. 5 | Ex. 6 |
|---|---|---|---|---|---|
| Non-annealed elastomer | | | | | |
| SAH | 44 | 45 | 45 | 44 | 45 |
| BS (MPa) | 6.2 | 8.0 | 7.7 | 5.9 | 8.1 |
| EB (%) | 590 | 700 | 730 | 580 | 750 |
| 100% modulus (MPa) | 1.3 | 1.3 | 1.1 | 1.3 | 1.3 |
| Ts (N/mm) | 35 | 39 | 40 | 40 | 41 |
| Annealed elastomer | | | | | |
| SAH | 53 | 51 | 53 | 53 | 55 |
| BS (MPa) | 8.0 | 7.3 | 8.3 | 7.0 | 8.2 |
| EB (%) | 620 | 540 | 580 | 510 | 580 |

TABLE 7-continued

Mechanical properties of the non-annealed and annealed silicone elastomers

| | Comp. 5 | Ex. 3 | Ex. 4 | Ex. 5 | Ex. 6 |
|---|---|---|---|---|---|
| 100% modulus (MPa) | 1.8 | 1.8 | 1.9 | 1.8 | 1.9 |
| Ts (N/mm) | 45 | 51 | 50 | 47 | 47 |

Optimization of the Composition Comprising the Additive X2

Various formulations were tested by varying the content of additive X2, of SiH resin and of butyl titanate.

TABLE 8

Formulations tested

| Test | Comp. 6 | Ex. 7 | Ex. 8 | Ex. 9 | Ex. 10 | Comp. 7 |
|---|---|---|---|---|---|---|
| Base Composition | 89.1 | 89.1 | 89.1 | 89.1 | 89.1 | 89.1 |
| HVI1 Oil | 3.7 | 3.7 | 3.7 | 3.7 | 3.7 | 3.7 |
| HVI2 Oil | 4.5 | 4.5 | 4.5 | 4.5 | 4.5 | 4.5 |
| SiH resin | 2 | 1.9 | 1.8 | 1.4 | 0.9 | 0.5 |
| Additive X2 | 0.66 | 0.66 | 0.66 | 1.13 | 1.61 | 2.03 |
| TBOT | 0 | 0.09 | 0.18 | 0.135 | 0.09 | 0.135 |
| ECH | 0.05 | 0.05 | 0.05 | 0.05 | 0.05 | 0.05 |
| Platinum ppm | 50 | 50 | 50 | 50 | 50 | 50 |
| Total | 100 | 100 | 100 | 100 | 100 | 100 |
| mmol epoxy/100 g formulation | 1.9 | 1.9 | 1.9 | 3.2 | 4.6 | 5.8 |
| SiH/Vi mole ratio | 2.5 | 2.5 | 2.4 | 2.3 | 2.2 | 2.0 |

For all of the formulations tested, the SiH/Vi mole ratio is between 2 and 3.4.

TABLE 9

Adhesion characterization on various supports (in MPa) and rate of crosslinking

| Test | Comp. 6 | Ex. 7 | Ex. 8 | Ex. 9 | Ex. 10 | Comp. 7 |
|---|---|---|---|---|---|---|
| PA6 (NA) | 0.7 | 1.8 | 2.7 | 1.8 | 2.2 | 0.8 |
| PA6 (A) | 1.5 | 1.9 | 2.4 | 1.8 | 2.1 | 1.2 |
| PA66 (NA) | 1.3 | 1.9 | 2.7 | 2.4 | 2.2 | 0.8 |
| PA66 (A) | 1.3 | 2.2 | 2.4 | 2.7 | 2.5 | 1.0 |
| Alu (NA) | 0.7 | 0.9 | 1.0 | 1.3 | 1.5 | 1.7 |
| Alu (A) | 0.5 | 1.1 | 1.3 | 1.9 | 2.1 | 2.1 |
| Steel (NA) | 1.7 | 1.3 | 1.5 | 2.0 | 2.2 | 2.0 |
| Steel (A) | 1.9 | 1.6 | 1.7 | 2.5 | 2.9 | 0.9 |
| Peak rate (S'/min) | 35.7 | 37.4 | 40 | 40.5 | 38.7 | 24.9 |

Comparative Example 6 shows that when the composition does not comprise butyl titanate, the adhesion to polyamide 6 or 6.6 and to aluminium is lower.

Comparative Example 7 shows that the rate of crosslinking of the silicone composition and the adhesion between the silicone elastomer and polyamide 6 or 66 decreases substantially when the epoxy content is equal to 5.8 mmol of epoxy per 100 g of silicone composition. The Peak rate value is less than 30, which is too low for the desired application.

TABLE 9

Mechanical properties of the non-annealed and annealed elastomers

|  | Comp. 6 | Ex. 7 | Ex. 8 | Ex. 9 | Ex. 10 | Comp. 7 |
|---|---|---|---|---|---|---|
| Non-annealed elastomer | | | | | | |
| SAH | 45 | 47 | 48 | 49 | 48 | 42 |
| BS (MPa) | 6.9 | 7.8 | 6.4 | 7.8 | 7.4 | 6.8 |
| EB (%) | 680 | 710 | 580 | 600 | 650 | 690 |
| 100% modulus (MPa) | 1.4 | 1.3 | 2.0 | 1.4 | 1.5 | 1.2 |
| Ts (N/mm) | 37 | 38 | 38 | 37 | 38 | 37 |
| Annealed elastomer | | | | | | |
| SAH | 55 | 54 | 54 | 55 | 54 | 51 |
| BS (MPa) | 7.4 | 8.3 | 7.5 | 7.7 | 8.5 | 7.4 |
| EB (%) | 520 | 600 | 530 | 580 | 620 | 640 |
| 100% modulus (MPa) | 2 | 1.9 | 2.0 | 1.9 | 1.9 | 1.5 |
| Ts (N/mm) | 42 | 43 | 44 | 42 | 41 | 41 |

The invention claimed is:

1. A process for preparing a composite article CA comprising:

a) applying a polyaddition-crosslinking silicone composition C to a rigid metal, glass or thermoplastic resin substrate S, said composition comprising:

(A) at least one organopolysiloxane A comprising per molecule at least two $C_2$-$C_6$ alkenyl groups, bonded to two different silicon atoms, (B) at least one organohydrogenopolysiloxane resin B, (C) at least one additive X which is a linear organopolysiloxane comprising siloxyl units (I.1) to (I.3) having the following formulae:

  (I.1)

  (I.2)

  (I.3)

and not comprising any units of formula (I.4):

  (I.4)

wherein:
a=1 and b=1 or 2,
d=1 and e=1 or 2,
the symbol Y represents a radical comprising a hydrocarbon-based group containing from 2 to 20 carbon atoms and an epoxy function, optionally with one or more heteroatoms; optionally the symbol Y is selected from the group of radicals consisting of: alkyl glycidyl ether, linear, branched or cyclic epoxyalkyl, linear, branched or cyclic epoxyalkenyl and carboxylic acid glycidyl ester,
the symbols $Z^1$, $Z^2$ and $Z^3$, which may be identical or different, represent a monovalent hydrocarbon-based group containing from 1 to 30 carbon atoms, optionally selected from the group consisting of alkyl groups containing from 1 to 8 carbon atoms and aryl groups containing from 6 to 12 carbon atoms, and optionally selected from the group consisting of a methyl, ethyl and propyl group, with the following conditions:
the additive X comprises, per molecule, at least one siloxyl unit (I.1) bearing epoxy-functional hydrocarbon-based groups, at least three siloxyl units (I.3) bearing hydrogenosiloxyl groups and a total number of siloxyl units N of between 7 and 30, (D) at least one reinforcing filler D,
(E) at least one organotitanium compound M,
(F) at least one polyaddition catalyst F, optionally a compound of at least one metal belonging to the platinum group, and
(G) optionally an inhibitor G, and
the amounts of the various constituents of said composition C are such that the [SiH]/[SiAlkenyl] mole ratio is between 1.5 and 3.6 with
[SiFl]=total number of moles of siloxyl units comprising a hydrogen atom bonded to silicon, and
[SiAlkenyl]=total number of moles of siloxyl units comprising an alkenyl radical bonded to silicon, and b) crosslinking said silicone composition C by heating to a temperature of between 40 and 250° C., optionally between 100 and 220° C., to obtain a composite article CA comprising a silicone elastomer E with adhesion to said rigid substrate S.

2. The process according to claim 1, wherein the concentration of epoxy functions in the silicone composition C is between 0.20 and 5 mmol per 100 g of composition C.

3. The process according to claim 1, wherein the content of organotitanium compound M in the silicone composition C is between 0.005 and 0.35 part by weight per 100 parts by weight of the composition C.

4. The process according to claim 1, wherein the reinforcing filler D is a fumed silica with a specific surface area measured according to a BET method of between 100 and 400 m²/g.

5. The process according to claim 1, wherein a) and b) take place in an injection moulding machine.

6. The process according to claim 1, wherein the rigid substrate S is a moulded thermoplastic resin part.

7. A composite article CA comprising a rigid glass, metal or thermoplastic resin substrate S and a silicone elastomer E obtained by crosslinking the silicone composition C as defined in claim 1.

8. The composite article CA according to claim 7, wherein the substrate S is made of thermoplastic resin and has been obtained by moulding.

9. The integrally moulded composite article CA according to claim 8, made with one or more injection moulding machines.

10. A polyaddition-crosslinking silicone composition C comprising:

(A) at least one organopolysiloxane A comprising per molecule at least two $C_2$-$C_6$ alkenyl groups, bonded to two different silicon atoms, (B) at least one organohydrogenopolysiloxane resin B, (C) at least one additive X which is a linear organopolysiloxane comprising siloxyl units (I.1) to (I.3) having the following formulae:

  (I.1)

  (I.2)

-continued $$H_d Z_e^3 SiO_{\frac{4-(d+e)}{2}} \quad (I.3)$$

and not comprising any units of formula (I.4):

$$Z_2^2 SiO_{\frac{2}{2}} \quad (I.4)$$

wherein:
a=1 and b=1 or 2,
d=1 and e=1 or 2,
the symbol Y represents a radical comprising a hydrocarbon-based group containing from 2 to 20 carbon atoms and an epoxy function, optionally with one or more heteroatoms; optionally, the symbol Y is selected from the group of radicals consisting of: alkyl glycidyl ether, linear, branched or cyclic epoxyalkyl, linear, branched or cyclic epoxyalkenyl and carboxylic acid glycidyl ester,
the symbols $Z^1$, $Z^2$ and $Z^3$, which may be identical or different, represent a monovalent hydrocarbon-based group containing from 1 to 30 carbon atoms, optionally selected from the group consisting of alkyl groups containing from 1 to 8 carbon atoms and aryl groups containing from 6 to 12 carbon atoms, and optionally selected from the group consisting of a methyl, ethyl and propyl group,
with the following conditions:
the additive X comprises, per molecule, at least one siloxyl unit (I.1) bearing epoxy-functional hydrocarbon-based groups, at least three siloxyl units (I.3) bearing hydrogenosiloxyl groups and a total number of siloxyl units N of between 7 and 30,
(D) at least one reinforcing filler D,
(E) at least one organotitanium compound M,
(F) at least one polyaddition catalyst F, optionally a compound of at least one metal belonging to the platinum group, and
(G) optionally an inhibitor G, and the amounts of the various constituents of said composition C are such that the [SiH]/[SiAlkenyl] mole ratio is between 1.5 and 3.6 with
 [SiH]=total number of moles of siloxyl units comprising a hydrogen atom bonded to silicon, and
 [SiAlkenyl]=total number of moles of siloxyl units comprising an alkenyl radical bonded to silicon, and
wherein said composition C comprises per 100 parts by weight:
 from 0.1 to 2.5 parts by weight of organohydrogenopolysiloxane resin B,
 from 0.4 to 2 parts by weight of additive X, and
 from 0.005 to 0.35 part by weight of organotitanium compound M.

11. The silicone composition C according to claim 10, comprising per 100 parts by weight of composition C:
 from 55 to 80 parts by weight of organopolysiloxane A,
 from 0.3 to 2.2 parts by weight of organohydrogenopolysiloxane resin B,
 from 0.03 to 0.25 part by weight of organotitanium compound M,
 from 20 to 40 parts by weight of reinforcing filler D,
 from 0.002 to 0.01 part by weight of platinum, and
 from 0 to 0.1 part by weight of inhibitor G.

12. A two-component system which is a precursor of the composition C as defined according to claim 10, which is in two separate parts C1 and C2 intended to be mixed to form the composition C, wherein one of these parts contains the catalyst F whereas the other part contains the resin B and the additive X.

13. A silicone elastomer E obtained by crosslinking the silicone composition C as defined according to claim 10.

14. A product comprising the composition C according to claim 10, in cast moulding, in transfer moulding, in injection moulding, in extrusion moulding or in compression moulding.

* * * * *